Patented Aug. 3, 1948

2,446,454

UNITED STATES PATENT OFFICE 2,446,454

PRODUCTION OF SECONDARY AND TERTIARY HALOGENATED ALCOHOLS

Ernst Bergmann and Max Sulzbacher, London, England, assignors to Polymerisable Products Limited, London, England, a British company No Drawing. Application February 3, 1945, Serial No. 576,150. In Great Britain March 13, 1944

11 Claims. (Cl. 260—618)

The present invention deals with an improvement in the production of halogenated secondary and tertiary alcohols by condensation of aldehydes on the one hand with poly-halogenated compounds possessing a mobile hydrogen atom on the other. The halogeno-compounds involved are those in which an accumulation of halogen atoms in the immediate vicinity of a CH group makes the hydrogen atom of this group reactive, particularly in the sense of the scheme:

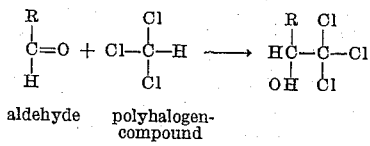

Specifically, as polyhalogenated compounds, chloroform or bromoform can be employed. In U. S. A. application No. 510,700 of Ernst Bergmann, filed Nov. 17, 1943, the production of acetone-chloroform has been described, using as a most successful condensing agent the novel complex between potassium hydroxide and organic solvents containing two ether oxygen atoms, separated by at least one and not more than two carbon atoms, particularly acetals and ethyleneglycol, dialkyl-ethers. Such complexes have been described in the U. S. A. applications No. 464,790, now abandoned, No. 493,301, now abandoned, and 583,177 of our co-worker Dr. Chas. Weizmann (this latter now Patent No. 2,435,524), and No. 510,700 and No. 514,727 of Ernst Bergmann.

We have now found that these complexes bring about the condensation on the one hand of trihalogeno-methanes and on the other hand, aldehydes. In most cases the yields are very satisfactory and reaction takes place in cases in which other condensing agents are without effect. Care must also be taken that the speed of self-condensation of the aldehydes is substantially lower, under the conditions employed than that of the reaction with chloroform or bromoform.

Aldehydes especially suitable are for that reason benzaldehydes (as an example of aromatic aldehydes) and branched aliphatic aldehydes, such as isobutyraldehyde and 2-ethyl-hexanal (as examples of aliphatic aldehydes).

The reaction has preferably to be carried out at low temperature and it is advisable to discontinue the treatment when the conversion has reached about 85%. This prevents undue dehalogenation of the organic halogen compounds, and the unreacted aldehyde and chloroform can be recovered and re-used in subsequent runs of the process.

The potassium hydroxide employed is nearly all recovered in the form of an aqueous solution of about 30% concentration, by treating the reaction product with an appropriate amount of ice or ice water, thus hydrolysing the potassium salt of the halogenated alcohol. From the said aqueous solution the solid potassium hydroxide can be recovered in an appropriate way, e. g. by distilling off the water in the presence of appropriate organic solvents such as the above acetals and glycol-ethers.

Obviously, the reaction product can also be worked up by treatment with a dilute aqueous acid; in this case, however, the potassium hydroxide cannot easily be recovered.

The following examples show how the reaction can be carried into effect, but the invention is not limited to these examples:

Example 1.—1.1.1-trichloro-3-ethyl-heptanol-(2)

The complex was prepared from 250 cc. dry methylal and 60 g. potassium hydroxide powder, containing 51 g. (0.9 mol.) pure KOH, at −2° C. and a mixture of 107.5 g. (0.9 mol.) chloroform and 128 g. 2-ethyl-hexanal (1 mol.) was added at −3° C. The mixture was agitated at the same temperature for further two hours and decomposed with ice water. The following fractions were secured:

| | |
|---|---|
| Methylal | 40–45° C. |
| Chloroform, 37.0 g.=34.4% of the initial amount | 58–65° C. |
| 2-ethyl-h e x a n a l, 55.0 g. =43.0% of the initial amount | 75–88° C./16 mm. |
| 1.1.1-trichloro-3-ethyl-heptanol-(2), 120.0 g.=53.9% of the theory | 135–140° C./16 mm. |

This chlorinated alcohol,

is a new compound; it forms a slightly yellowish oil. This is insoluble in water, soluble in most organic solvents (including light petroleum distillates). At about −40° C. it solidifies to a glassy mass.

Found: C, 43.9; H, 7.0; Cl, 42.5.
Calc. for $C_9H_{17}OCl_3$: C, 43.6; H, 6.9; Cl, 43.0.

Example 2.—Trichloromethyl-isopropyl-carbinol 60 g. potassium hydroxide powder, corresponding to 51 g. (0.9 mol.) pure KOH, were converted into the complex with 250 cc. of dry methylal at −2° C. A mixture of 107.5 g. (0.9 mol.) chloroform and 72 g. (1 mol.) isobutyraldehyde (B. P. 61°) was slowly added to the fine, well-agitated suspension during one hour, the internal temperature being kept at about −4° C. The agitation was continued for a further two hours at −2°. The mixture was decomposed with ice water and dilute sulphuric acid and the methylal solution separated and thoroughly dried with anhydrous magnesium sulphate.

Fractional distillation gave:

At 40–45° C. Methylal

At 58–70° C. mixture of unreacted chloroform and isobutyraldehyde

At 125–135° C. redistilled B. P. 125–130°, trichloro-methyl-isopropyl-carbinol, a pale yellow liquid, 24.8 g. =1414.4% of the theoretical amount.

It will be understood that in place of the acetals mentioned, other solvents of the above-defined type can be similarly employed. The amount of such solvent can vary between wide limits. Such bodies contain in their molecule two ether-forming oxygen atoms separated from each other by not more than two carbon atoms, i. e.

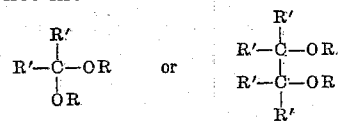

where R may represent the same or different hydrocarbon radicles and R' may represent hydrogen or the same or different hydrocarbon radicles.

As examples of suitable solvents, which form stable complexes with potassium hydroxide, the following may be mentioned:

The acetal from 2-ethyl-hexanal and methyl alcohol.

The acetal from methyl-ethyl-ketone and ethylene glycol.

The acetal from formaldehyde and propylene glycol.

Acetaldehyde dibutyl acetal.

The acetal from acetone and butyl alcohol.

Ethylene-glycol-ethyl-butyl-ether.

Ethylene-glycol-dibutyl-ether.

Propylene-glycol-ethyl-butyl-ether.

The use of certain aldehydes may present difficulties, as the speed of self-condensation is in some cases commensurate with that of the reaction with chloroform. In the instances where this is not the case, the reaction is very smooth, as for example in the case of benzaldehyde and branched aliphatic aldehydes such as isobutyraldehyde and 2-ethyl-hexanal.

What we claim and desire to secure by Letters Patent is:

1. In making a tri-halogenated alcohol, the process which comprises reacting together at about ice temperature, about 0.9 mol. of a tri-halogen methane with about 1 mol. of an aldehyde containing at least four carbon atoms to the molecule, in the presence of about 0.9 mol. of caustic potash in the form of a solid complex with a substance selected from the group consisting of acetals and dialkyl ethers of glycols and a substantial excess of such latter substance which substance contains in its molecule two and only two ether-forming oxygen atoms which are separated from each other by at least one and not more than two carbon atoms, and stopping the reaction, when sufficiently completed by adding an excess of a substantially ice-cold aqueous substance which is inert to the metal-free organic substances present.

2. A process as in claim 1 in which the reaction is allowed to continue only until about 85% completed.

3. A process as in claim 1 in which the product of the first reaction is mixed with enough H2O at about ice temperature to react with all of the organically combined potassium present in the reaction product with the production of an aqueous KOH solution of about 30% concentration.

4. A process of producing a halogenated alcohol which comprises reacting under refrigeration, a tri-halogeno-methane with an aldehyde containing at least four carbon atoms to the molecule, in the presence of caustic potash in the form of a solid complex with a substance selected from the group consisting of acetals and dialkyl ethers of glycols and a substantial excess of such latter substance, which said substance contains in its molecule two and only two ether-forming oxygen atoms which are separated from each other by at least one and not more than two carbon atoms.

5. A process as in claim 4, in which the substance selected from the group consisting of acetals and dialkyl ethers of glycols, is free from any hydroxyl groups.

6. A process as in claim 4, in which the said aldehyde contains a branched hydrocarbon chain in which the branching is at the carbon atom immediately adjacent the aldehyde group.

7. A process as in claim 4, in which the tri-halogeno-methane is chloroform.

8. A process which comprises condensing a tri-halogeno-methane with 2-ethyl-hexanal, in the presence of caustic potash in the form of a solid complex with a substance selected from the group consisting of acetals and dialkyl ethers of glycols and a substantial excess of such latter substance, which said substance contains in its molecule two and only two ether-forming oxygen atoms which are separated from each other by at least one and not more than two carbon atoms.

9. A process according to claim 4 in which the condensation is that between chloroform and 2-ethyl-hexanal.

10. The new chemical compound 1.1.1-trichloro-3-ethyl-heptanol(2), $$CH_3.CH_2.CH_2.CH_2.CH(C_2H_5).CH(OH).CCl_3$$

11. A process of producing a halogenated alcohol which comprises reacting, under refrigeration and at about ice temperature, a trihalogeno-methane with an aldehyde selected from the group consisting of branched chain aliphatic aldehydes and aromatic aldehydes, in the presence of a solid complex of potassium hydroxide and a substance selected from the group consisting of acetals and dialkyl ethers of glycols, and a substantial excess of said latter substance, which said substance contains in its molecule two and only two ether-forming oxygen atoms which are separated from each other by at least one and not more than two carbon atoms, and thereafter hydrolyzing the potassium derivative of the halogenated alcohol so produced.

ERNST BERGMANN.
MAX SULZBACHER.

REFERENCES CITED

The following references are of record in the file of this patent:

UNITED STATES PATENTS

| Number | Name | Date |
|---|---|---|
| 761,189 | Aldrich | May 30, 1904 |
| 777,712 | Aldrich | Dec. 20, 1904 |
| 2,161,191 | Perkins | June 6, 1939 |
| 2,345,170 | Zeltner | Mar. 28, 1944 |

FOREIGN PATENTS

| Number | Country | Date |
|---|---|---|
| 515,539 | Germany | Jan. 13, 1931 |

OTHER REFERENCES

Howard et al.: Jour. Am. Chem. Soc., vol. 60, 228–9 (1938).

Rapson et al.: Chem. Soc. Jour. (1944), 74–5.